United States Patent
Katzensteiner

(10) Patent No.: US 8,061,084 B2
(45) Date of Patent: Nov. 22, 2011

(54) SEAL PROFILE

(75) Inventor: Thomas Katzensteiner, Gaflenz (AT)

(73) Assignee: Knorr-Bremse Gesellschaft MIT, Modling (AT)

( * ) Notice: Subject to any disclaimer, the term of this patent is extended or adjusted under 35 U.S.C. 154(b) by 723 days.

(21) Appl. No.: 11/816,560

(22) PCT Filed: Feb. 9, 2006

(86) PCT No.: PCT/EP2006/001133
§ 371 (c)(1),
(2), (4) Date: Apr. 24, 2008

(87) PCT Pub. No.: WO2006/087131
PCT Pub. Date: Aug. 24, 2006

(65) Prior Publication Data
US 2009/0026709 A1    Jan. 29, 2009

(30) Foreign Application Priority Data

Feb. 18, 2005   (AT) .................................. A 269/2005

(51) Int. Cl.
*B60J 10/00* (2006.01)
*B61D 19/02* (2006.01)
*F16P 3/12* (2006.01)
(52) U.S. Cl. ............... 49/483.1; 49/27; 49/28; 49/475.1
(58) Field of Classification Search ............... 49/26, 27, 49/28, 366, 367, 368, 370, 475.1, 483.1, 49/489.1
See application file for complete search history.

(56) References Cited

U.S. PATENT DOCUMENTS

| | | | | |
|---|---|---|---|---|
| 4,115,952 A * | 9/1978 | French | .............................. | 49/26 |
| 4,133,365 A * | 1/1979 | Schleicher | ..................... | 160/118 |
| 4,370,833 A * | 2/1983 | Niemanns | ..................... | 49/489.1 |
| 5,345,671 A | 9/1994 | Miller | | |
| 5,384,982 A * | 1/1995 | Galperin | ........................... | 49/27 |
| 5,438,798 A * | 8/1995 | Plamper et al. | ..................... | 49/28 |
| 5,581,951 A * | 12/1996 | Ryan et al. | .................... | 49/498.1 |
| 5,728,984 A * | 3/1998 | Miller | ........................ | 200/61.43 |
| 6,125,591 A * | 10/2000 | Schmidhuber et al. | ...... | 49/477.1 |
| 7,603,813 B2 * | 10/2009 | Hackl | .............................. | 49/506 |
| 2004/0140186 A1 | 7/2004 | Burgess et al. | | |

FOREIGN PATENT DOCUMENTS

| | | |
|---|---|---|
| DE | 9418117 U1 | 2/1995 |
| DE | 102004005289 A1 | 8/2005 |
| EP | 1111633 A | 6/2001 |
| WO | 03097977 A | 11/2003 |

* cited by examiner

*Primary Examiner* — Katherine Mitchell
*Assistant Examiner* — Justin Rephann
(74) *Attorney, Agent, or Firm* — Barnes & Thornburg LLP

(57) ABSTRACT

A seal profile for the closing edge of a door includes a body and at least one chamber defined within the body. A deformation sensor is disposed within the at least one chamber. At least one sealing lip defines proximal and distal ends, the proximal end being attached to a surface of the body. The at least one chamber is disposed substantially centrally and on an end region of the body. The at least one sealing lip extends outwardly from the end region of the body from a location adjacent to the at least one chamber. The at least one sealing lip protrudes obliquely with respect to the end region. The distal end of the at least one sealing lip extends further from the end region than the at least one chamber.

10 Claims, 1 Drawing Sheet

SEAL PROFILE

CROSS-REFERENCE TO RELATED APPLICATIONS

This is a National Stage Entry from International Patent Application No. PCT/EP2006/001133, filed on Feb. 9, 2006. The International Application, in turn, relies for priority on Austrian Patent Application No. A269/2005, filed on Feb. 18, 2005. This application relies for priority on these two applications, the contents of both of which are incorporated herein by reference.

FIELD OF THE INVENTION

The invention relates to seal profiles. More specifically, the invention concerns seal profiles for the main closing edges of sliding doors, swinging-sliding doors and compartment doors of vehicles. Even more specifically, the invention relates to seal profiles for rail vehicles, where the seal profile includes at least one chamber for accommodation of a deformation sensor therein and at least one sealing lip.

DESCRIPTION OF THE RELATED ART

Profiles of this type are known, for example, from EP 1 288 420 A, DE 196 42 21 A, DE 94 06 445 U and DE 298 08 292 U, and generally satisfactorily meet the safety requirements imposed on them.

A current safety guideline requires that sensors be fitted in cavities within the rubber seal profile. The sensors generally are "switching strips", but other sensors may be employed. For example pressure monitors, which react to the compression of gas enclosed in the cavity are also known. Sensors of these types are required to be sensitive enough to recognize if thin objects become trapped between the seal and its opposing surface. The sensors are required to detect objects such as walking sticks, crutches, thin folders, individual fingers and even dog leads (or leashes) and items of clothing. In order to achieve this level of sensitivity, the cavities in which the sensors are fitted have been brought ever closer to the outer contour of the cross section of the seal profile. With respect to seals disposed in the closing direction of doors, the seals have been moved ever closer to the end of the profile to avoid intermediate elements, the deformation of which reduces the transmission of the trapping action.

The result of these measures is that the door seals may no longer satisfy their original purpose, mainly to seal the door. This effect is apparent at least in the region of the main closing edge of the doors at which such seal profiles are generally or even compulsorily used.

SUMMARY OF THE INVENTION

It is therefore the object of the invention to provide a door seal, in particular for the main closing edge of the door, which reacts reliably and with a high degree of sensitivity even to thin trapped objects, but at the same time improves the sealing action of such a seal.

According to the invention, in the cross section of the profile, at least one chamber provided for a sensor is located at least approximately centrally and in the end region of the seal profile. At least one sealing lip extends from the end region of the profile in the vicinity of the transition from the end to the sensor chamber. From the end, the sealing lip protrudes outwardly and obliquely, preferably at an angle of at least 30°. The sealing lip also projects in a direction perpendicular to the end, over the outer contour of the sensor chamber. In other words, the distance from the proximal end of the sealing lip to the distal end of the sealing lip is greater than the distance that the sensor chamber extends from the end region.

In one contemplated embodiment, the sensor chamber is preferably arranged precisely centrally. In addition, the profile, as a whole, is constructed symmetrically in cross section and has two sealing lips.

This design, which includes a mating profile with an essentially V-shaped cross section at least in its end region, ensures that the sealing lip is sufficiently deformed, even at the softness required for obtaining the needed sensitivity of the sensor device. In addition, in the closed state of the door, the design applies sufficient force against the mating profile and, thus, ensures sufficient sealing. By means of the V-shaped design of the sealing gap in the closed state of the door, the sensitivity of the sensor arrangement is also significantly improved. Sensitivity is improved, because objects trapped between the outer end regions of the sealing gap, in which the actual sealing takes place by means of the sealing lip, are pressed against the sensor strip (or another sensor). Any object trapped between the outer end regions of the sealing gap will increase further the forces necessary to recognize the trapped state of the object.

In addition to this, in one refinement, the shape and depth of the mating profile in the region of the sealing gap are designed in such a manner that, in the closed state of the door, the chamber for the sensor bears in the central region virtually against the base of the V while a significant volume remains free in each case laterally therefrom. Therefore, when the door is closed, not only are there two sealing surfaces in contact but also, in between, in the manner of a contact-free seal, there are two sealing chambers with a restrictor arranged in between.

BRIEF DESCRIPTION OF THE DRAWINGS

The invention is explained in more detail below with reference to the drawings, in which.

DETAILED DESCRIPTION OF EMBODIMENT(S) OF THE INVENTION

Figure 1:
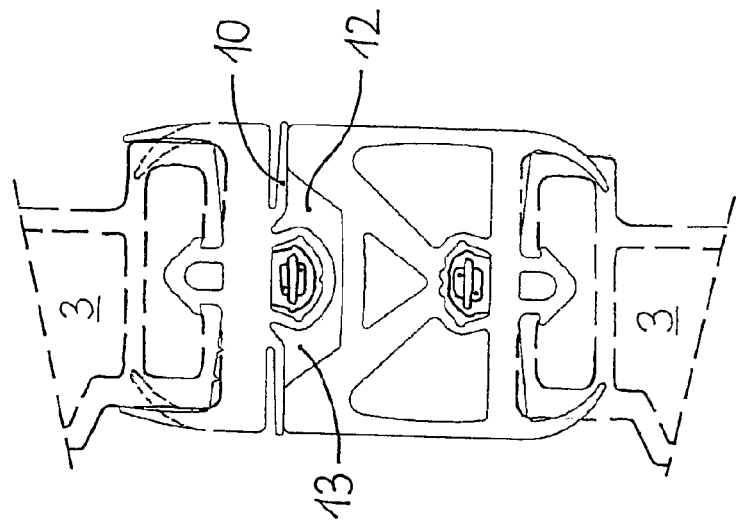
FIG. 1 shows the state of the seals when the door is open.

FIG. 1 illustrates a pair of interacting seals in a schematic cross-section perpendicular to the longitudinal extent of the seal. One such pair of seals comprises a male profile 1 and a female profile 2 with an essentially V-shaped end surface. The two profiles are fastened in a matching manner to door leaves 3, preferably, for example, by means of strips 4 which have a mushroom-like cross section and also by means of sealing strips 5 which are expanded elastically by means of the door leaf. The sealing strips 5 bear tightly against the exterior of the door leaf 3.

In the exemplary embodiment illustrated, both the male profile 1 and the female profile 2 are provided with a respective chamber for receiving a matching collision sensor. In the illustrated embodiment, the chamber 6 provided in the female profile 2 may be equipped with a sensor that detects, during the closing of the door, if there is still sufficient space between the two profiles 1, 2 in order, for example, to pass an arm, a briefcase or the like through. Sensors of this type do not have to be very sensitive but should reliably react to the trapping of a limb or of a child. Therefore, it is desirable to position the sensor in the chamber 6 where it receives impacts and knocks only transmitted by the profile webs 7 which are of V-shaped design.

The construction for the chamber 8 differs from the construction of the chamber 6. Specifically, the chamber 8 protrudes over the end 9 of the male profile 1. As a result, in the event of a collision or impact, the sensor provided in the chamber 8 is activated directly and without any damping. Sensors of this type are frequently activated only after the door has been closed, since merely the vibrations at the end of the closing movement would suffice, if the two seal profiles 1, 2 come into contact with each other, to activate the sensor.

According to the invention, the chamber 8 is formed in the central region of the end 9. In addition, from the region in which the chamber 8 protrudes beyond the end 9, two sealing lip(s) 10 also protrude from the end 9. In one contemplated variation, only one lip 10 protrudes from the end 9. As may be appreciated by those skilled in the art, the invention includes at least one lip 10, but could include a greater number.

According to a preferred refinement of the invention, the angle α between the lips 10 and the surface of the end 9 is at least 30°, preferably approximately 45°. The sealing lips 10 protrude obliquely outwards from a position near the central region of the end 9. In addition, the lips 10 are of a length such that their tips extend from the end 9 a greater distance than the chamber 8. In other words, the tips of the lips 10 are disposed at a greater height from the end than the top of the chamber 8. For definitional purposes, the base of each sealing lip 10 is referred to as the proximal end (i.e., the end proximal to the end 9), while the tip is referred to as the distal end (i.e., the end distal from the end 9).

Figure 2:
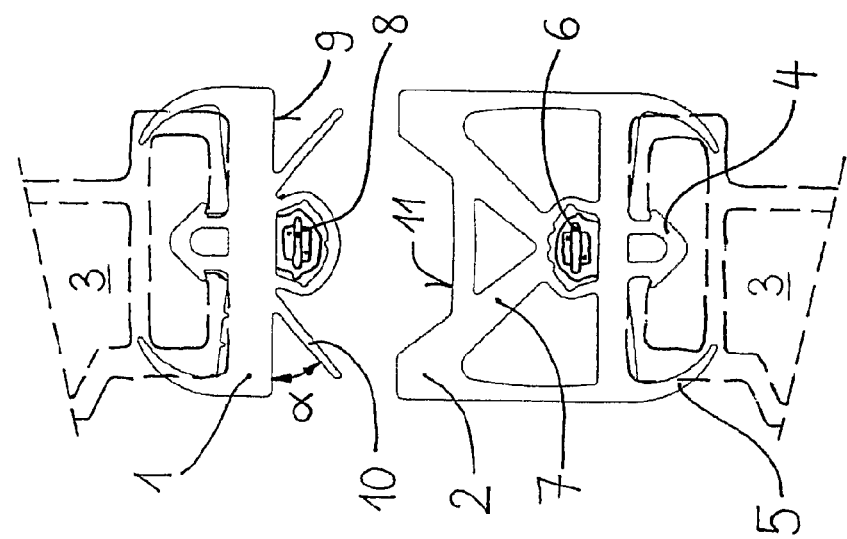
FIG. 2 shows the state of the seals when the door is closed.

When FIGS. 1 and 2 are compared, it becomes apparent that the long design of the sealing lips 10, in conjunction with the V-shaped design of the contour of the female seal 2, helps to establish a reliable seal. As is apparent from the drawings, the sealing lips 10 are elastically deformed to a sufficient extent that they bear with sufficient force against the contour 11 of the mating profile in order to bring about reliable sealing. As may be appreciated from FIG. 2, this also has the effect that the sealing lips 10 bear over a significant section of the contour 11. Therefore, soiling and damage to the profile 2 or the sealing lips 10 do not reduce significantly the sealing action. In addition, misalignments (or inaccuracies) between the profile 2 and the sealing lips 10 also do not result in a significant diminution of the sealing action therebetween.

As also becomes apparent from a study of FIG. 2, the volume enclosed between the two seals essentially includes two chambers 12, 13 that are virtually separated from each other by the projection of the sensor chamber 8 from the end 9. By means of this measure, the space also acts as a contact-free seal, namely with two chambers 12, 13 and a restrictor arranged in between.

The invention is not restricted to the exemplary embodiment(s) illustrated and described, but may also be modified in different ways. In particular, it is possible to select asymmetrical formations which then, under some circumstances, also make the provision of two different profiles superfluous. In this contemplated example, a sensor chamber located entirely in the end region would then be provided on both sides and each of the two profiles would bear a sealing lip. Finally, it is also unnecessary to provide a sensor chamber 6 for severe collisions, and also, overall, it is only necessary to arrange at least one sealing lip 10, but the latter will be understood to satisfy the abovementioned conditions according to the invention.

Of course, the provision of further sealing lips, chambers or webs is possible, but, for the invention, it is contemplated primarily that a chamber for a sensor is provided in the end region of one of the seals and that a sealing lip project obliquely forward and outward approximately from the region at which the chamber opens into the end.

The door gap seal may be used not only for classic protection against trapping but also for "residual gap monitoring". This means that the switching strips are only switched actively for a few seconds by signal technology, after a locked message is generated by the system, in order to recognize whether an object has been trapped.

Other embodiments and variations will be appreciated by those skilled in the art. Those embodiments and variations are intended to fall within the scope of the invention.

What is claimed is:

1. A seal profile for a closing edge of a door, the profile comprising:
   a body;
   at least one chamber defined within the body;
   a deformation sensor disposed within the at least one chamber; and
   a plurality of sealing lips each defining proximal and distal ends provided at opposite ends of a major axis of each of the sealing lips, the proximal ends each being attached to a surface of the body apart from each other by a distance that is less than a distance apart for each of the corresponding distal ends,
   wherein the at least one chamber is disposed substantially centrally within the body and on an end region of the body, wherein each of the plurality of sealing lips extends outwardly from the end region of the body from locations adjacent to the at least one chamber, wherein the plurality of sealing lips each protrude along the major axis thereof obliquely with respect to the end region, and wherein the distal ends of each of the plurality of sealing lips extend further from the end region than the at least one chamber.

2. The seal profile of claim 1, wherein the at least one chamber is arranged precisely centrally on the end region.

3. The seal profile of claim 1, wherein the plurality of sealing lips comprises two sealing lips, each being disposed symmetrically on either side of the at least one chamber.

4. The seal profile of claim 1, wherein each one of the plurality of sealing lips is disposed at an angle of at least 30° with respect to the end region.

5. The seal profile of claim 4, wherein each one of the plurality of sealing lips is disposed at an angle of 45° with respect to the end region.

6. The seal profile of claim 1, wherein the at least one chamber contains a gas such that compression of the at least one chamber increases the pressure of the gas, thereby activating the deformation sensor.

7. A door incorporating the seal profile of claim 1, wherein the door is a sliding door, a swinging door, or a compartment door.

8. The door of claim 7, wherein the door is a vehicle door.

9. The door of claim 8, wherein the vehicle is a rail vehicle.

10. The seal profile of claim 1, wherein the proximal end of each of the sealing lips moves in angled relationship to the distal end when the door is closed to form a seal.

\* \* \* \* \*

UNITED STATES PATENT AND TRADEMARK OFFICE
CERTIFICATE OF CORRECTION

| | | |
|---|---|---|
| PATENT NO. | : 8,061,084 B2 | Page 1 of 1 |
| APPLICATION NO. | : 11/816560 | |
| DATED | : November 22, 2011 | |
| INVENTOR(S) | : Thomas Katzensteiner | |

It is certified that error appears in the above-identified patent and that said Letters Patent is hereby corrected as shown below:

Title Page
In section "(73)" "Knorr-Bremse Gesellschaft MIT" should read --Knorr-Bremse Gesellschaft mit beschrankter Haftung--.

Signed and Sealed this
Twelfth Day of June, 2012

David J. Kappos
*Director of the United States Patent and Trademark Office*